United States Patent [19]

Wood

[11] 4,148,542
[45] Apr. 10, 1979

[54] PANEL MOUNTED LOCKING DEVICE FOR COMPONENTS

[75] Inventor: Theodore H. Wood, Brewster, Mass.

[73] Assignee: Alden Research Foundation, Westboro, Mass.

[21] Appl. No.: 847,163

[22] Filed: Oct. 31, 1977

[51] Int. Cl.² .............................................. H02B 1/04
[52] U.S. Cl. ............................................. 339/126 RS
[58] Field of Search .............................. 339/125–127; 248/87.1

[56] References Cited

U.S. PATENT DOCUMENTS

| 2,793,351 | 5/1957 | Heath ................................ 339/127 R |
| 3,559,152 | 1/1971 | Pearce .......................... 339/127 R X |

Primary Examiner—Roy Lake
Assistant Examiner—E. F. Desmond
Attorney, Agent, or Firm—James H. Grover

[57] ABSTRACT

A locking mechanism for panel-mounted components having apertures with a transverse dimension narrower than the elongate dimension, the mechanism including a pair of flanges adapted to fit through the aperture and engage one side of the panel and a backing surface with bosses that are designed seat in the aperture with the backing surface resting against the other side of the panel. A variety of electrical components can be secured with this locking device, such as female connectors, switches and lamps.

10 Claims, 6 Drawing Figures

PANEL MOUNTED LOCKING DEVICE FOR COMPONENTS

BACKGROUND OF THE INVENTION

The present invention relates to locking mechanisms for components such as electrical couplings and the like which are placed in panels for display or electrical connections. In the past these components have generally been secured to a panel with bolts or screws that extend from the face of the panel into the component itself.

STATEMENT

According to the present invention the mounting portion of a component is inserted into a generally rectangular aperture in a panel and rotated. A pair of bosses on a backing surface of the component then seat in the aperture and prevent further rotation. A clamp including a pair of flanges is disposed on the mounting portion to engage the rear of the panel and secure the bosses in place.

DRAWINGS

DESCRIPTION

Figure 1:
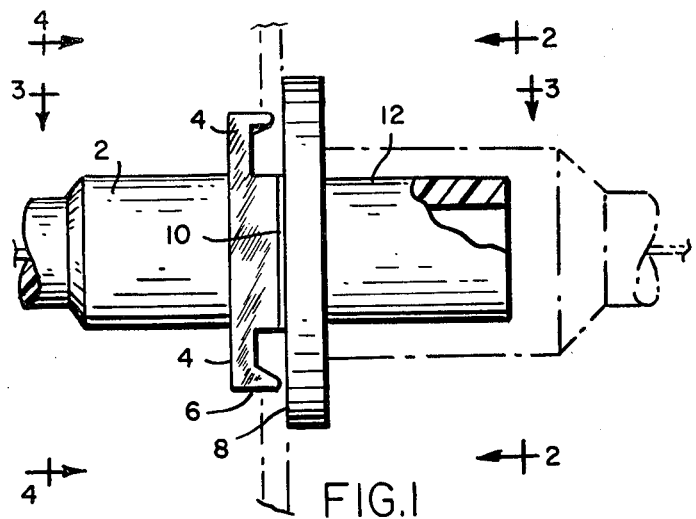
FIG. 1 is an elevational view of the locking mechanism which will be used to secure a female electrical connector to the panel.

Referring now to the drawings, in FIG. 1 an electrical connector is shown having a mount or body portion 2. A clamping mechanism is arranged on the body 2 and includes a pair of flanges 4 which extend radially outwardly from the body 2 and are generally spaced 180 degrees apart. A ramp 6 extends inwardly from each of the flanges 4 and is adapted to rest against the rear of the panel (shown in phantom lines). A backing surface 8 is disposed upon the body 2 and preferably spaced from the ramp 6 at a distance (at the highest end) less than the thickness of the panel into which the connector is to be inserted and (at the lowest end) greater than the thickness of the panel. In this way, the connector can be freely turned at first and then the pressure will gradually increase because the flanges become splayed until a maximum is reached when the highest portion of the ramp 6 is forced against the panel. The area of the backing surface 8 is sufficient to provide a firm support for the connector and prevent it from falling through the aperture.

A pair of bosses 10 (one shown in this drawing) extend from the body 2 and have a width which approximates the width of the aperture into which the mount is to be inserted. The thickness of the bosses are sufficient for the sides to engage the edges of the aperture and prevent further rotation of the body 2 once it is seated. After the body 2 has been seated in the aperture, another element can be easily coupled to it, as for example a male connector (shown in phantom lines herein).

Figure 2:
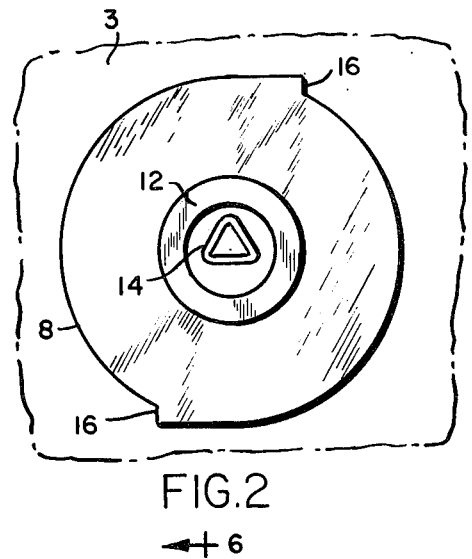
FIG. 2 is a plan view taken along the line 2—2 of FIG. 1 and illustrates the front of the mechanism disposed in the panel.

Referring now to FIG. 2, the electrical connector is shown with the panel disposed behind it. A hollow shield 12, which forms an outer portion of the body 2, surrounds a receptor 14. A pair of steps 16 are conveniently located on the perimeter of the backing surface 8 so that the mount can be gripped and turned with pliers to seat the connector in the panel.

Figure 3:
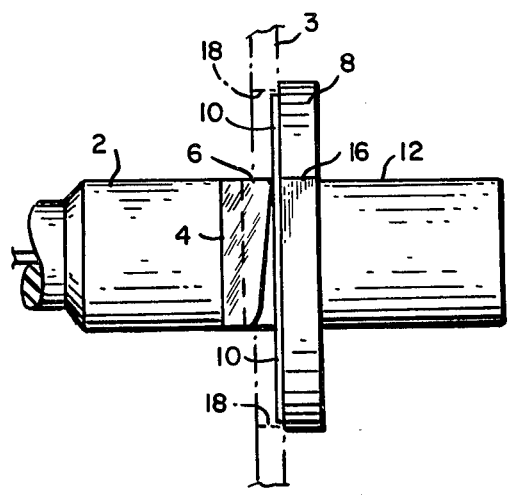
FIG. 3 is an elevational view of the locking mechanism shown in FIG. 1 when the component has been rotated 90 degrees.

In FIG. 3, the connector of FIG. 1 has been rotated 90 degrees. The ramp 6 on flange 4 has a preferred shape with the least height at one side and the greatest height at the other side. The highest and lowest portions of the cooperating ramp on the other flange (not shown) will be oppositely disposed. The bosses 10 extend from the body of the mount and in the preferred embodiment are integrally molded to the backing surface 8.

Figure 4:
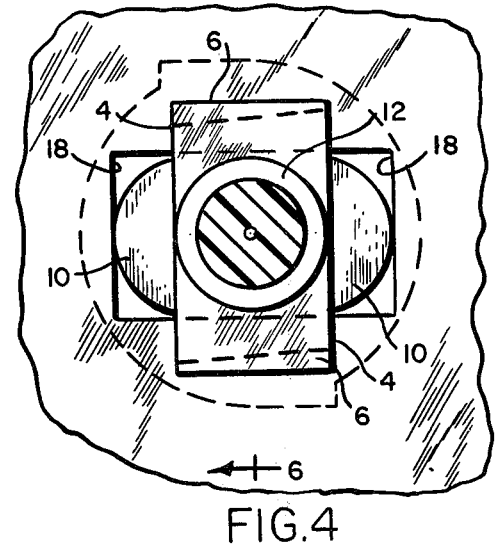
FIG. 4 is a plan view taken from the line 4—4 of FIG. 1 and illustrates the back of the mechanism in the panel in the locked position.

Turning now to FIG. 4, the flanges 4 extend from both sides of body 2 and are of a shape that will enable them to be slipped through the aperture 18 and then rotated to seat the bosses 10 snugly within the aperture 18. As shown, the bosses 10 are disposed radially from the body 2 and each of which is semicircular in peripheral shape and are just slightly smaller than the width and the length of the aperture 18. Through the cooperative effect of flanges 4 and bosses 10 all movement of the component of the component within the aperture 18 is eliminated. The highest portions of ramped surfaces 6 (shown in phantom lines) rest against the panel thereby splaying flanges 4, providing a resilient, spring-like bias to secure the body to the panel. Because these locking devices are frequently seated in the panels for many years, the cold-flow characteristics of the materials that are used to form the flanges must be considered. Such characteristics frequently tend to warp the flanges to relieve the stress inparted by the splaying. But because of the disposition of bosses 10 on the backing surface 8, rotational movement is prevented and the flanges 4 still hold the connector within the aperture 18 even when the stress is relieved.

Figure 5:
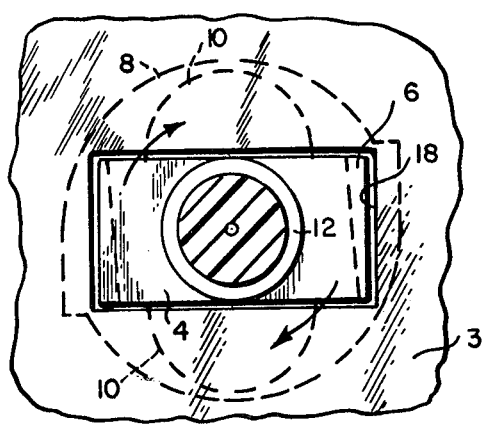
FIG. 5 is a plan view and illustrates the locking mechanism device after the component has been inserted into the aperture but before it has been rotated 90 degrees.

As seen in FIG. 5, the flanges 4 can generally coincide in peripheral shape to the aperture 18 so that they can be fitted therein. When the mount is rotated 90 degrees, as shown by the direction of the arrows, the bosses 10 (shown in phantom lines) will be seated in aperture 18 and be held by the cooperative action of ramped surfaces 6 and backing surface 8 which are then disposed on opposite sides of the panel 3.

Figure 6:
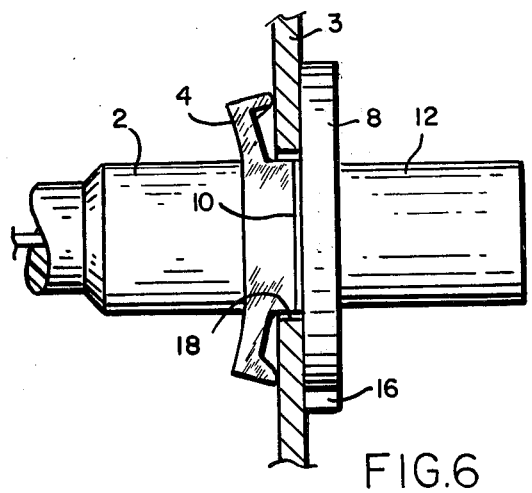
FIG. 6 is an elevational view, partially in cross-section, and illustrates the mechanism after the component has been inserted into the panel and locked into position.

As shown in FIG. 6, turning the connector will gradually splay flanges 4 to form a spring-like restraint which seats the bosses 10 within the aperture 18 of panel 3. With great difficulty and purposeful intent, backing surface 8 can be grasped with pliers and pulled, while twisting, to detach the body from the panel 3.

While the preferred use of the present locking device is for a female electrical connector, as shown, it is apparent that many other uses are possible such as indicator lights or switches. It is thus our intent only to be limited by the scope of the appended claims.

I claim:

1. A locking mechanism for attachment of a component to a panel having an aperture with a transverse dimension narrower than the elongate dimension, the mechanism comprising: a mount with one end dimensioned to pass through said aperture; an enlarged backing surface for engaging one face of the panel and for preventing the other end of said mount from passing through said aperture; a boss disposed on the backing surface and adapted to seat within the aperture to prevent rotational movement; clamping means extending outwardly from said mount, the clamping means being spaced from the backing surface by approximately the thickness of the panel and bridging the transverse dimension of the aperture upon rotation of the mount and bearing on the other face of the panel to lock the device thereto.

2. The mechanism according to claim 1 wherein the clamping means is flexible and includes inclined ramps extending therefrom towards said other face, the lowest portion of said ramps being arranged to slide past the other face of the panel and the highest portion being arranged to force against said other face and splay the clamping means.

3. The mechanism according to claim 2 wherein the boss will seat in the aperture when the mount is rotated and highest portion of the inclined ramp is in contact with the other face when the clamping means is splayed.

4. A locking device for connectors comprising: a mount adapted to be inserted into an aperture in a panel; a pair of flanges extending from said mount and arranged to engage one side of said panel; a backing surface larger than the aperture and disposed in front of said flanges and adapted to engage the other side of the panel; boss means on the backing surface angularly disposed relative to said flanges and adapted to seat within said aperture so as to prevent rotational movement of said mount when said mount is inserted in the aperture.

5. The device according to claim 4 wherein ramps extend from said flanges towards the panel and backing surface and are arranged to engage said other side of the panel.

6. The device according to claim 4 wherein the boss means are and disposed at substantially right angles to said flanges.

7. The device according to claim 5 wherein ramps are arranged so that upon turning the mount, the lower portion first contacts the panel and upon continued rotation, the highest portion contacts the panel whereby the flanges are splayed against the panel.

8. The device according to claim 7 wherein the lower portion of the ramp is spaced from the backing surface by more than the thickness of the panel into which the mount is to be inserted and the higher portion is spaced from the backing surface by less than the thickness of the panel into which the mount is to be inserted whereby the flange is splayed and forces the backing surface against the panel.

9. The device according to claim 7 wherein the mount is adapted to fit into a four sided aperture and wherein the boss means is divided into two portions which are disposed radially from said mount, each of which is semicircular in peripheral shape and of a thickness approximately that of the panel into which the mount is to be inserted, and each of the portions has at least one side adapted to butt against an edge of the aperture into which the mount is to be inserted, whereby when the boss means is disposed in the aperture it is retained therein by the pressure of the splayed flanges and further substantial rotation is prevented by the boss butting against the edges of the aperture.

10. The device according to claims 5 wherein the mount is a hollow shield which surrounds the female portion of an electrical connector.

* * * * *